US011621900B2

(12) United States Patent
Nolan et al.

(10) Patent No.: US 11,621,900 B2
(45) Date of Patent: Apr. 4, 2023

(54) SELECTIVE MEASUREMENT REPORTING FROM INTERNET OF THINGS DEVICES

(71) Applicant: Intel Corporation, Santa Clara, CA (US)

(72) Inventors: Keith Nolan, Mullingar (IE); Mark Kelly, Leixlip (IE); Michael Nolan, Celbridge (IE); John Brady, Celbridge (IE)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 14/998,171

(22) Filed: Dec. 23, 2015

(65) Prior Publication Data
US 2017/0187588 A1 Jun. 29, 2017

(51) Int. Cl.
*H04L 43/065* (2022.01)
*H04L 43/16* (2022.01)
(Continued)

(52) U.S. Cl.
CPC ............ *H04L 43/065* (2013.01); *H04L 43/02* (2013.01); *H04L 43/0811* (2013.01);
(Continued)

(58) Field of Classification Search
CPC ... H04L 43/065; H04L 43/02; H04L 43/0811; H04L 43/16; H04L 43/0894; H04W 4/005
See application file for complete search history.

(56) References Cited

U.S. PATENT DOCUMENTS

| 9,146,605 | B2 * | 9/2015 | Lee | A61B 5/02438 |
| 2007/0163324 | A1 * | 7/2007 | McMahan | G01D 3/02 |
| | | | | 73/1.38 |

(Continued)

FOREIGN PATENT DOCUMENTS

| CN | 101383721 A | 3/2009 |
| CN | 102866697 A1 | 1/2013 |

(Continued)

OTHER PUBLICATIONS

Sean Bowen, "When Internet Of Things Meets Imperfect Networks", published Jun. 12, 2014; http://www.informationweek.com/strategic-cio/executive-insights-and-innovation/when-internet-of-things-meets-imperfect-networks/a/d-id/1269585; retrieved Mar. 23, 2016; 10 pages.

(Continued)

*Primary Examiner* — Nicholas R Taylor
*Assistant Examiner* — Tania M Pena-Santana
(74) *Attorney, Agent, or Firm* — Schwabe, Williamson & Wyatt, P.C.

(57) ABSTRACT

In various embodiments, an IoT device may provide selective reporting of collected data measurements. The IoT device may report the data via a network connection to an aggregator device. The IoT device may detect when the network connection has been interrupted, during which messages containing measurements may be cached. Later, when the network connection has been restored, the IoT device may "replay" the cached messages. The IoT device may selectively report cached messages based on an entropy analysis which may detect which measurements exhibit a higher entropy. The entropy analysis may determine which measurements show a higher rate of change or which have a value outside of a set of thresholds. The IoT device may select measurements based on a history of measurements (Continued)

obtained by the IoT device. Other embodiments may be described and/or claimed.

24 Claims, 9 Drawing Sheets (51) Int. Cl.
*H04L 43/0811* (2022.01)
*H04W 4/70* (2018.01)
*H04L 43/02* (2022.01)
*H04L 43/0894* (2022.01)

(52) U.S. Cl.
CPC ............... *H04L 43/16* (2013.01); *H04W 4/70* (2018.02); *H04L 43/0894* (2013.01)

(56) References Cited

U.S. PATENT DOCUMENTS

| | | | | |
|---|---|---|---|---|
| 2010/0315242 | A1* | 12/2010 | Bullard | H04W 4/38 340/602 |
| 2011/0055481 | A1* | 3/2011 | Murakami | G06F 12/0875 711/118 |
| 2012/0197852 | A1* | 8/2012 | Dutta | H04L 67/565 707/E17.005 |
| 2012/0246261 | A1* | 9/2012 | Roh | H04L 67/75 709/227 |
| 2013/0227336 | A1 | 8/2013 | Agarwal et al. | |
| 2013/0278422 | A1 | 10/2013 | Friedman | |
| 2014/0136608 | A1* | 5/2014 | Lin | G06F 17/30867 709/203 |
| 2017/0235298 | A1* | 8/2017 | Nixon | G05B 19/418 700/19 |
| 2017/0280279 | A1* | 9/2017 | Ghosh | H04W 4/02 |

FOREIGN PATENT DOCUMENTS

| | | |
|---|---|---|
| CN | 103024064 A | 4/2013 |
| CN | 103167517 A | 6/2013 |
| CN | 104636352 A | 5/2015 |
| KR | 10-2012-0124345 A | 11/2012 |

OTHER PUBLICATIONS

International Search Report and Written Opinion dated Feb. 16, 2017 for International Application No. PCT/US2016/062302, 15 pages.

* cited by examiner

SELECTIVE MEASUREMENT REPORTING FROM INTERNET OF THINGS DEVICES

TECHNICAL FIELD

The present disclosure relates to the field of data processing, in particular, to apparatuses, methods and storage media associated with reporting of measurements by Internet of Things (IoT) devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computing devices continue to proliferate as there are greater and greater calls for computing power to be introduced into everyday devices and situations. Society continues to increase progress toward the "Internet of Things", with its promise of ubiquitous computing availability in buildings, objects, spaces, etc. In various scenarios, the Internet of Things (IoT) may include networks of physical objects or "things" embedded with electronics, software, sensors, and network connectivity, which enables these objects to collect and exchange data. The IoT may allow objects to be sensed and controlled remotely across existing network infrastructure, creating opportunities for more direct integration between the physical world and computer-based systems, and resulting in improved efficiency, accuracy and economic benefit. In various scenarios, each IoT device may be uniquely identifiable through its embedded computing system but able to interoperate within existing Internet infrastructures. However, such infrastructures may not provide 100% reliable connectivity between multiple IoT devices and or between IoT devices and other devices meant to control or aggregate data collected by IoT devices. In circumstances where network connectivity suffers, data may be lost. Further, even if measured data is saved and sent upon restoration of connectivity, the resulting flood of data may create its own problems in terms of overtaxing network bandwidth, aggregator, or data pipeline processing capabilities.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, an IoT device which is configured to collect measurements may be configured to provide selective reporting of the collected data measurements, such as to an aggregator system or other computing system. In various embodiments, the measurements may be collected from a sensor, such as a sensor included as part of the IoT device or which is coupled to the IoT device in a wired or wireless manner. In various embodiments, such sensor measurements may include, but are not limited to: environmental data, such as temperature data, air pressure data, or humidity data; physical sensor readings, such as pressure data, shock force data, movement data, or shaking data; network data, such as network utilization data or packet information data; etc.

In various embodiments, the IoT device may be configured to report the data via a network connection (such as a wired or wireless network connection) to an aggregator device (or other device). The IoT device may be configured to detect when the network connection has been interrupted or otherwise has led to failure of delivery of one or more messages containing sensor measurements. During moments when such interruption (or delivery failure) has been detected, one or more messages containing measurements may be cached at the IoT device.

Later, when the IoT device detects that the network connection has been restored, the IoT device may "replay" the cached messages, e.g., the IoT device may send messages which were cached during the network interruption. However, a naïve replay of each and every message may overwhelm a network or cause the aggregating computer system to need to process too many messages in quick succession. Such a flood of messages may lead to increased costs for data transmission or data processing, or may cause other activities on the network or at the aggregating system to be delayed or lowered in priority. In order to avoid such negative effects, according to various embodiments, IoT devices may selectively report cached messages to the aggregating system. In various embodiments, such selective reporting may be based, at least in part, on an entropy analysis which may detect which measurements exhibit a higher entropy than other measurements. For example, the entropy analysis may determine which measurements show a higher rate of change relative to other, adjacent-in-time measurements, and may report only those higher-rate-of-change measurements. In other embodiments, the higher entropy measurements may be selected based off the measurements having an absolute value outside of a set of thresholds, or whose values are statistically unlikely compared to past values. In various embodiments, the IoT device may select higher entropy measurements based on a history of measurements obtained by the IoT device. In various embodiments, this history may be taken over the entire lifetime of the IoT device; in other embodiments, the history may be over a recent window of time that is less than the entire lifetime of the IoT device. By selecting only a subset of the complete set of cached measurements, the IoT device may reduce traffic and processing costs compared to a device which simply replays all cached sensor measurements. Other embodiments and implementation details are discussed below.

In various embodiments, IoT devices described herein may include various forms and types of devices, including, but not limited to, laptop computers, mobile devices such as mobile phones, tablets, etc. wearable devices such as computing-enabled glasses or watches as well as other devices, such as computing-enabled light bulbs, thermometers, traffic sensors, thermostats, refrigerators, ovens, etc. Additionally, while the term "computing devices" is used throughout to refer to devices and/or objects that have computing capabilities, no particular limitation should be inferred by this usage. Thus, in various embodiments, the "computing devices" referred to herein may include desktop or laptop computers, mobile devices, computing-capable sensors (e.g. thermometers, light sensors, etc.), computing-capable appliances (e.g., refrigerators), home automation equipment, vehicles, traffic or weather equipment, audio/visual equipment, etc.

Figure 1:
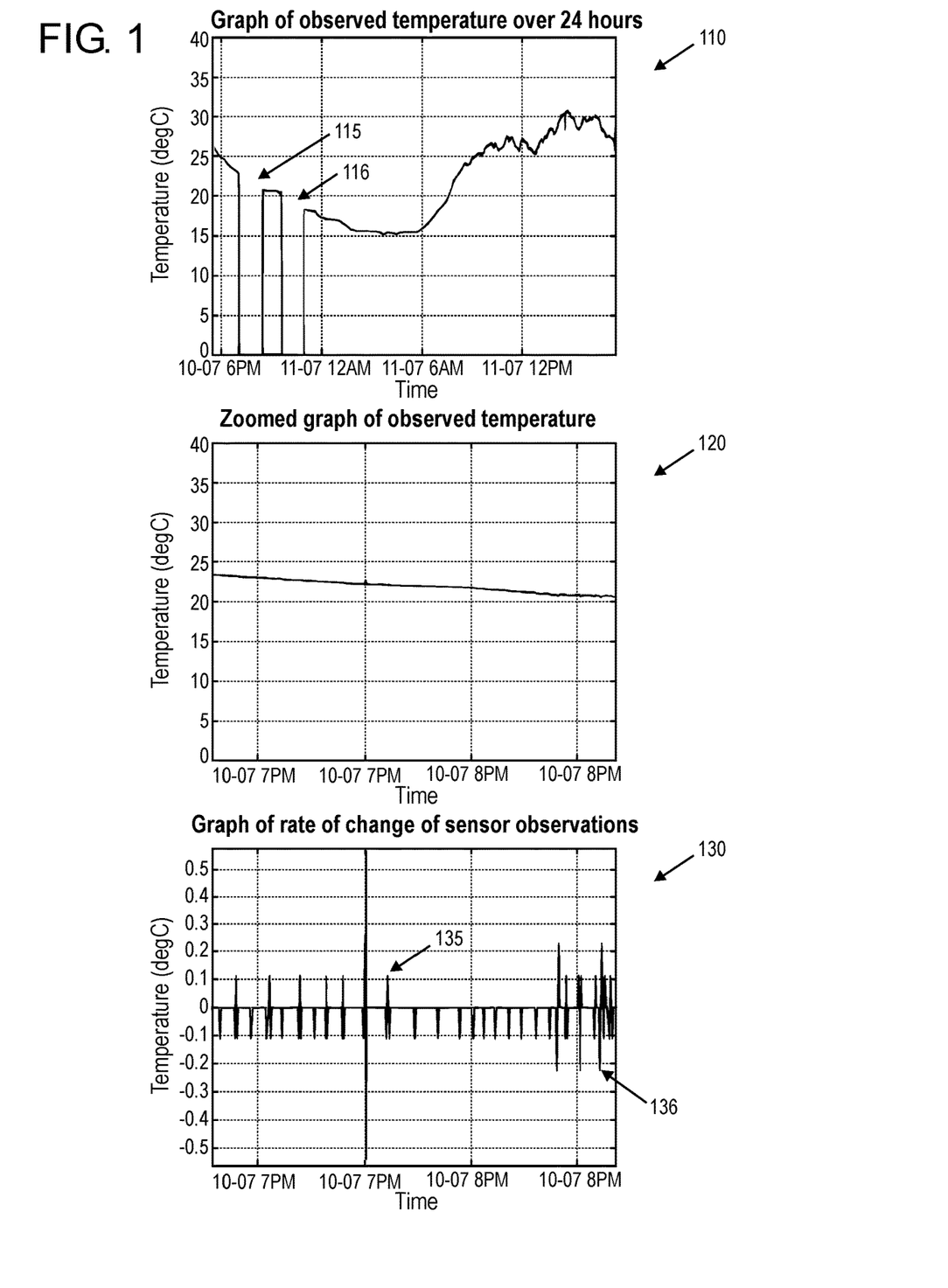
FIG. 1 illustrates examples of measurements that may be reported by an IoT device with selective measurement reporting, in accordance with various embodiments.

Referring now to FIG. 1, examples of observed measurements which may be reported by an IoT device with selective measurement reporting are illustrated in accordance with various embodiments. In the first example, graph 110 illustrates a series of temperature measurements taken and reported by a sensor of an IoT device over a 24 hour period. In the example illustrated in FIG. 1, however, there were two periods of network interruption, shown at periods 115 and 116. During these times, no measurements were received as reported from the IoT device. At graph 120, the measurements which were taken over these two periods are shown. As can be seen in the example of graph 120, the "missing" (e.g. unreported) data from these periods 115 and 116 shows a steadily dropping temperature.

According to some techniques, the "missing" measurements of periods 115 and 116 could be simply reported from the IoT device upon detection that the IoT device has restored its network connection. However, as discussed above, this may result in a large amount of data being sent in quick succession from the IoT device. Much of this data may not be necessary; in the example of FIG. 1, many of the "missing" temperature measurements may simply be similar to other measurements which were previously taken, and thus may be superfluous. This lack of change may be seen in graph 130, where a graph of the rate of change of the temperature measurements may be seen. As graph 130 illustrates, in this example, the majority of measurements represent 0 degrees of temperature difference from their immediate previous measurements. Only a subset of the measurements are greater or lesser than their immediate previous measurements, which can be seen as leading to values in the rate-of-change graph 130 that are higher or lower than 0, respectively. For example, the temperature measurement corresponding to point 135 is 0.1° C. higher than its immediate previous measurement, while the temperature measurement corresponding to point 136 is 0.2° C. lower than its immediate previous measurement. In various embodiments, when the IoT device is reporting measurements which were cached due to network connection issues, the IoT device may select those measurements which correspond to these higher rate-of-change points to reduce the number of measurements which are reported, leading to more efficient usage of network bandwidth and processing power.

Figure 2:
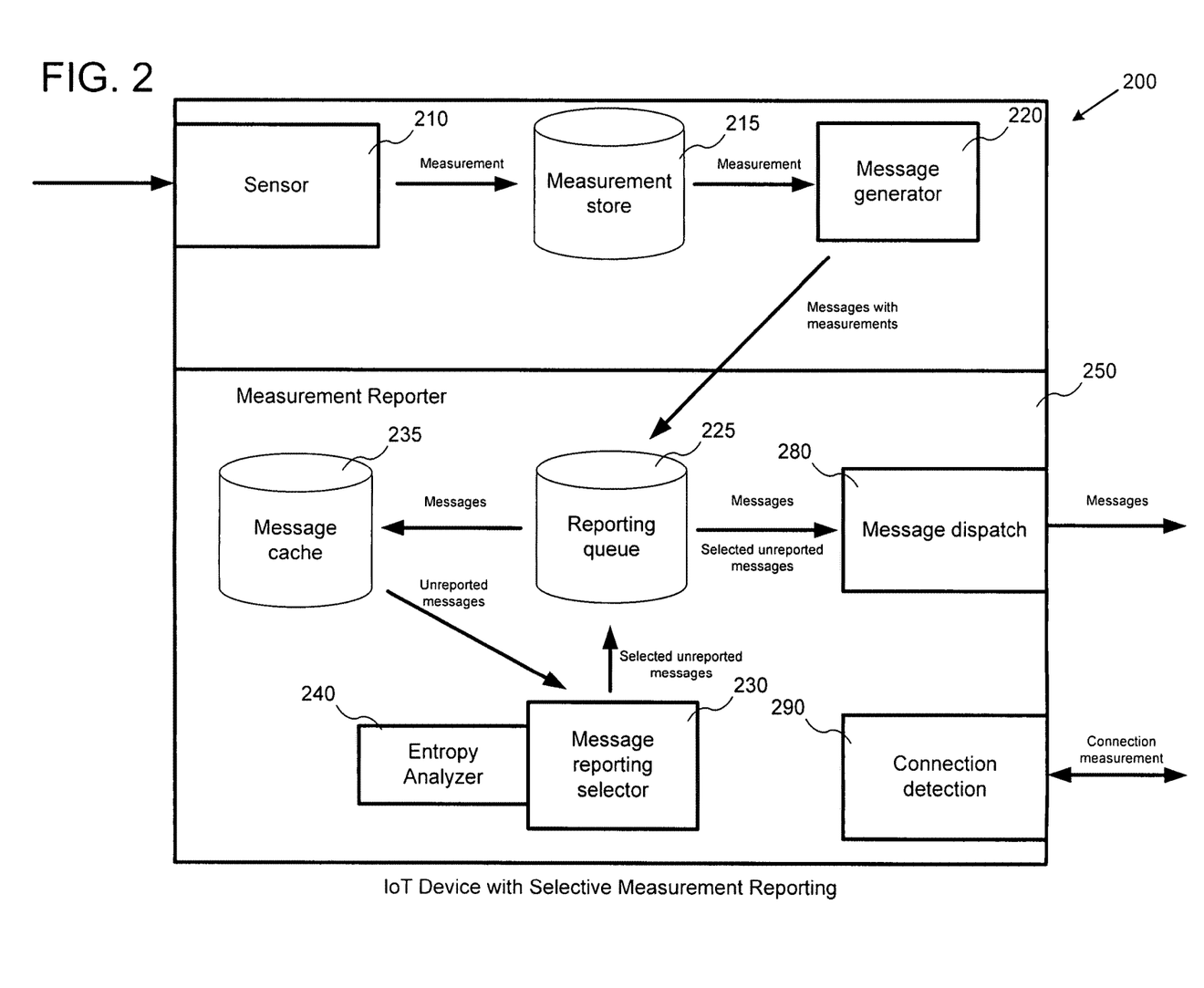
FIG. 2 illustrates an example components and information flows of an IoT device with selective measurement reporting, in accordance with various embodiments.

Referring now to FIG. 2, components and information flows of an IoT device 200 with selective measurement reporting are shown in accordance with various embodiments. It may be noted that, while particular processing, data collection, and storage components are illustrated, as well as particular information flows between these components, in various embodiments, the IoT device 200 may include other components or flows and/or may omit one or more components or flows illustrated in FIG. 2. In various embodiments, the illustrated components may be implemented in hardware and/or software, and may be configured to operate on computing devices of various form factors and capabilities, as discussed herein. Additionally, as discussed above, IoT device 200 may include devices of various form factors, purposes, and activities, including dedicated environmental, weather, traffic, network, or other sensors, computer-enabled appliances, laptop or desktop computers, mobile devices, tablets, etc.

In various embodiments, IoT device 200 may include a sensor 210 which may be configured to perform measurements of data, such as environmental, weather, traffic, physical touch, or other data. In various embodiments, the sensor 210 may be included in the IoT device 200, as illustrated, or may be located externally to the IoT device 200. In various embodiments, the sensor 210 may be configured to provide measurements on a periodic basis, such as every few milliseconds, seconds, hours, or days. In other embodiments, the sensor 200 may be configured to provide measurements on an event-based basis, such as in reaction to an event such as opening of a door, passage of a car over the sensor, etc., as may be understood.

In various embodiments, the sensor 210 may be configured to provide measurements to a measurement store 215 (MS 215) for maintenance and processing. In various embodiments, the MS 215, may utilize various techniques for storage of measurements from the sensor 210, including, but not limited to storage in a local or networked storage, the use of a database or other data structure for the storage, the storage of measurements as separate files in a directory, etc. In various embodiments, the IoT device 200 may include message generator 220 (MG 220), which may be configured to generate messages which include measurements in the MS 215 for reporting out of the IoT device 200. In various embodiments, the messages for reporting of the measurements may be generated according to known techniques.

In various embodiments, the IoT device 200 may include a measurement reporter 250 (MR 250), which may be configured to report the messages generated by the MG 220 and report these out of the IoT device 200, such as to a data aggregator system (not illustrated). In various embodiments, the MR 250 may be configured to detect interruption and/or resumption of network connections between the IoT device 200 and outside devices, to report these measurements when connections exist, and to selectively report measurements after resumption of interrupted connections. As illustrated, the MR 250 may include various components for performing this selective reporting.

In various embodiments, the MR 250 may include a reporting queue 225 (RQ 225), which may maintain messages generated by the MG 220 in an order for later reporting. In various embodiments, the RQ 225 may provide the messages to a message dispatch 280 (MD 280) which may be configured to transmit the queued messages in order from the RQ 225 out of the IoT device 200, such as to an aggregation system or other computing device. The MR 250 may also include a message cache 235 (MC 235), which may maintain messages which were generated by the MG 220 but which were not reported. In various embodiments, the MC 235 may receive messages from the RQ 225 in response to a determination that the message was not properly dispatched by the MD 280 such as due to a network connection interruption. In various embodiments, the RQ 225 and MC 235 may be implemented according to various techniques for implementing queues and caches, as may be understood, including storage in a local or networked storage, the use of a database or other data structure for the storage, the storage of measurements as separate files in a directory, etc. In various embodiments, the MR 250 may include a connection detector 290 (CD 290) which may be configured to detect a status of a network connection between the IoT device 200 and one or more other devices or computer systems. The CD 290 may be configured to perform this detection according to various techniques, as may be understood. According to one technique, the CD 290 may repeatedly attempt to request a webpage from a known stable site, such as a popular retail, corporate, or government site. The CD 290 may then detect the status of the network connection of the IoT device 200 based on a response code received in response to the request. In one example, if the response code is 400 or greater, the CD 290 may detect that the network connection has been interrupted; if the code is below 400, the CD 290 may detect that the network connection is connected, or, if it was previously interrupted, that the network connection has been restored. In other embodiments, the CD 290 may be configured to detect an increase in bandwidth of a connection, rather than restoration of a broken connection.

In various embodiments, the MR 250 may also include a message replay selector 230 (MRS 230), which maybe be configured to select messages which have been cached for reporting. In various embodiments, the MRS 230 may be configured to review cached messages in response to a determination that a network connection has been restored and to select those messages which should be reported. In various embodiments, the MRS 230 may then provide those selected unreported messages to the RQ 225 for later reporting by the MD 280. In various embodiments, the MR 250 may include an entropy analyzer 240 (EA 240), which may be configured to determine which messages include measurements which contain a higher level of entropy than other measurements, and thus who should be reported from the IoT device 200. In various embodiments, the EA 240 may be configured to determine which measurements exhibit a higher rate of change than other measurements. In yet other embodiments, the EA 240 may be configured to determine which measurements are outside of direct value thresholds, such as maximum or minimum threshold describing a "non-reporting band" of values which should not be reported. For example, for a temperature-sensing IoT device 200, the EA 240 may be configured to identify only measurements which are below 0° C. or above 40° C. for reporting. In yet other embodiments, the EA 240 may be configured to determine which measurements are outside of statistical value thresholds, such as values that fall outside of a particular number of standard deviations outside of a mean for measurements made by the sensor 210. In various embodiments, these statistical value thresholds may be made with reference to a history of measurements, such as measurements over the lifetime of the IoT device. In other embodiments, the statistical value thresholds may be made with reference to a history of measurements taken within a window of time that is less than the lifetime of the IoT device.

Figure 3:
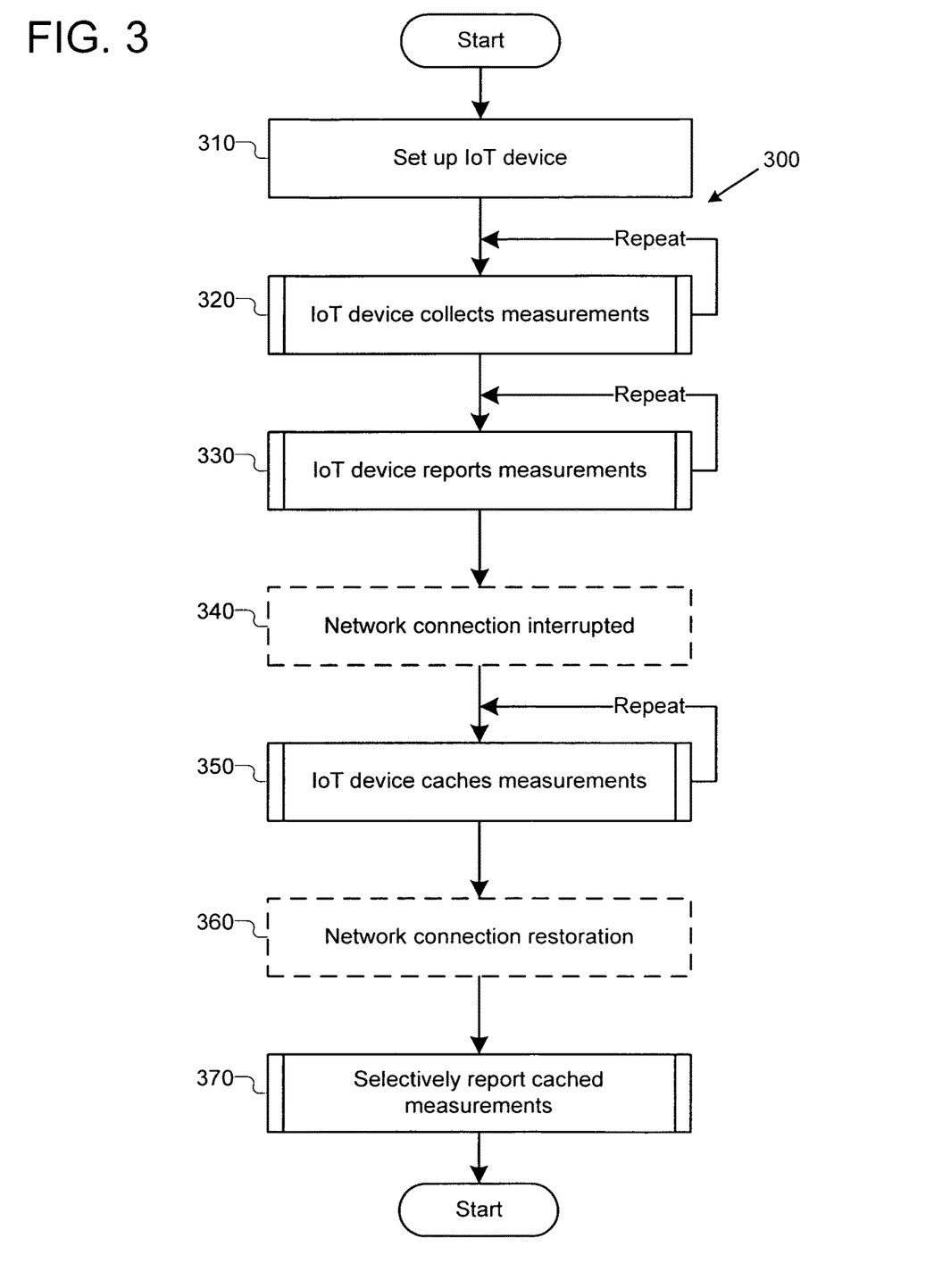
FIG. 3 illustrates an example process for selective reporting of measurements from an IoT device, in accordance with various embodiments.
Figure 4:
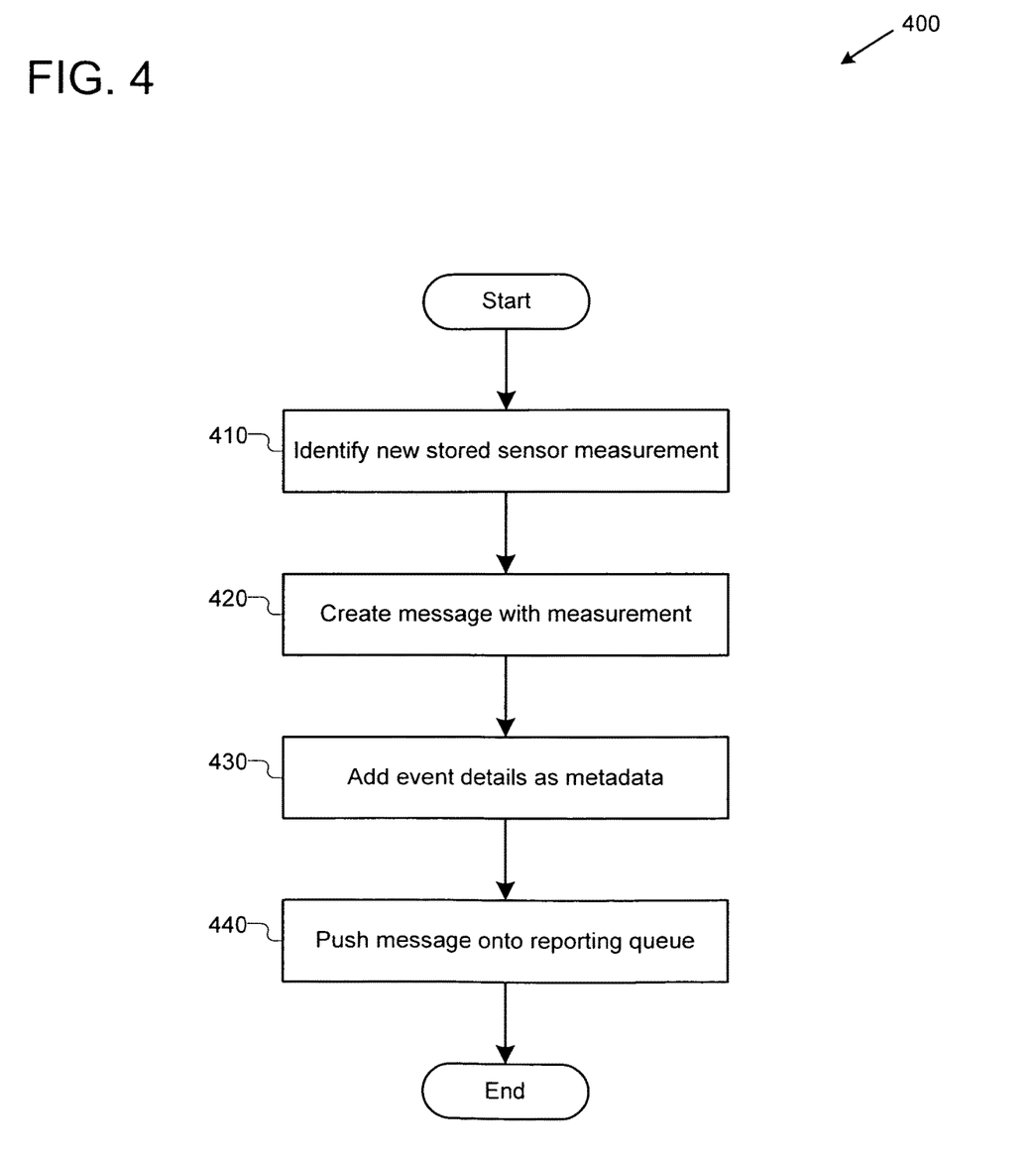
FIG. 4 illustrates an example process for collecting measurements, in accordance with various embodiments.

Referring now to FIG. 3, an example process 300 for selective reporting of measurements from the IoT device 200 is illustrated in accordance with various embodiments. While FIG. 4 illustrates particular operations in a particular order, in various embodiments the operations may be combined, split into parts, and/or omitted. The process may begin at operation 310, where the IoT device 200 may be set up. For example, at operation 310, the IoT device 200 may be physically placed to collect measurements, configured with one or more types of measurements to collect, and/or connected to one or more networks for reporting of measurements. At operation 310, the IoT device 200 may be configured to report to particular devices and/or aggregation systems, such as networked computers, websites, databases, MQ (message queuing) telemetry transport (MQTT) brokers, etc. In various embodiments, the IoT device may be provided with identities and/or network addresses for these devices.

Next, at operation 320, the IoT device 200 may collect and store measurements, such as from the sensor 210.

Particular embodiments of the process of operation 320 may be described below with reference to process 400 of FIG. 4. It may be noted that, while process 300 illustrates operation 320 as proceeding directly to operation 330 for the sake of simpler illustration, in various embodiments, the process of operation 320 may be a repeating process that may operate independently of later reporting processes. For example, operation 320 may operate in a separate operating system process or thread.

At operation 330, the MR 200 of the IoT device 200 may report measurements that were collected as a part of operation 320. Particular embodiments of the process of operation 330 may be described below with reference to process 500 of FIG. 5. Again, it may be noted that, in various embodiments, operation 320 may be a repeating process that may operate independently of the measurement collection process of operation 310.

Next, at operation 340, the network connection may be interrupted. This may occur due to various circumstances, as may be understood. For example, a cellular data connection may fail, or a physical break may occur in a wired network. Next, at operation 350, the MR 200 of the IoT device 200 may repeatedly cache measurements for later selective reporting once the network connection is restored. Particular embodiments of the process of operation 350 may also be described below with reference to process 500 of FIG. 5. Thus, in various embodiments, the IoT device 200 may perform one process 500 for performance of both reporting and caching of measurements. In other embodiments, however, the reporting and caching may be performed in separate processes. Next, at operation 360, the network connection may be restored, such as due to a repair or resetting of a network. In response, at operation 370, the MR 200 of the IoT device 200 may selectively report the cached measurements. Particular embodiments of the process of operation 370 may also be described below with reference to process 600 of FIG. 6. The process may then end.

Referring now to FIG. 4, an example process 400 for collecting measurements is illustrated in accordance with various embodiments. In various embodiments, process 400 may be performed to implement, in whole or in part, operation 320 of process 300 of FIG. 3. While FIG. 4 illustrates particular operations in a particular order, in various embodiments the operations may be combined, split into parts, and/or omitted. The process may begin at operation 410, where the MG 220 may monitor the MS 215 to identify a new and/or updated stored measurement from stored at the MS 215 by the sensor 210. Next at operation 420, the MG 220 may create a message with the new measurement for reporting from the IoT device 200. As discussed above, various techniques for IoT device message generation may be understood. Next, at operation 430, details about the measurement event, such as time/date, location, etc. may be added as metadata to the message. At operation 440, the MG 220 may then push the completed message onto the RQ 225. The process may then end. As discussed above, however, in various embodiments, the process may be repeated again for a new measurement.

Figure 5:
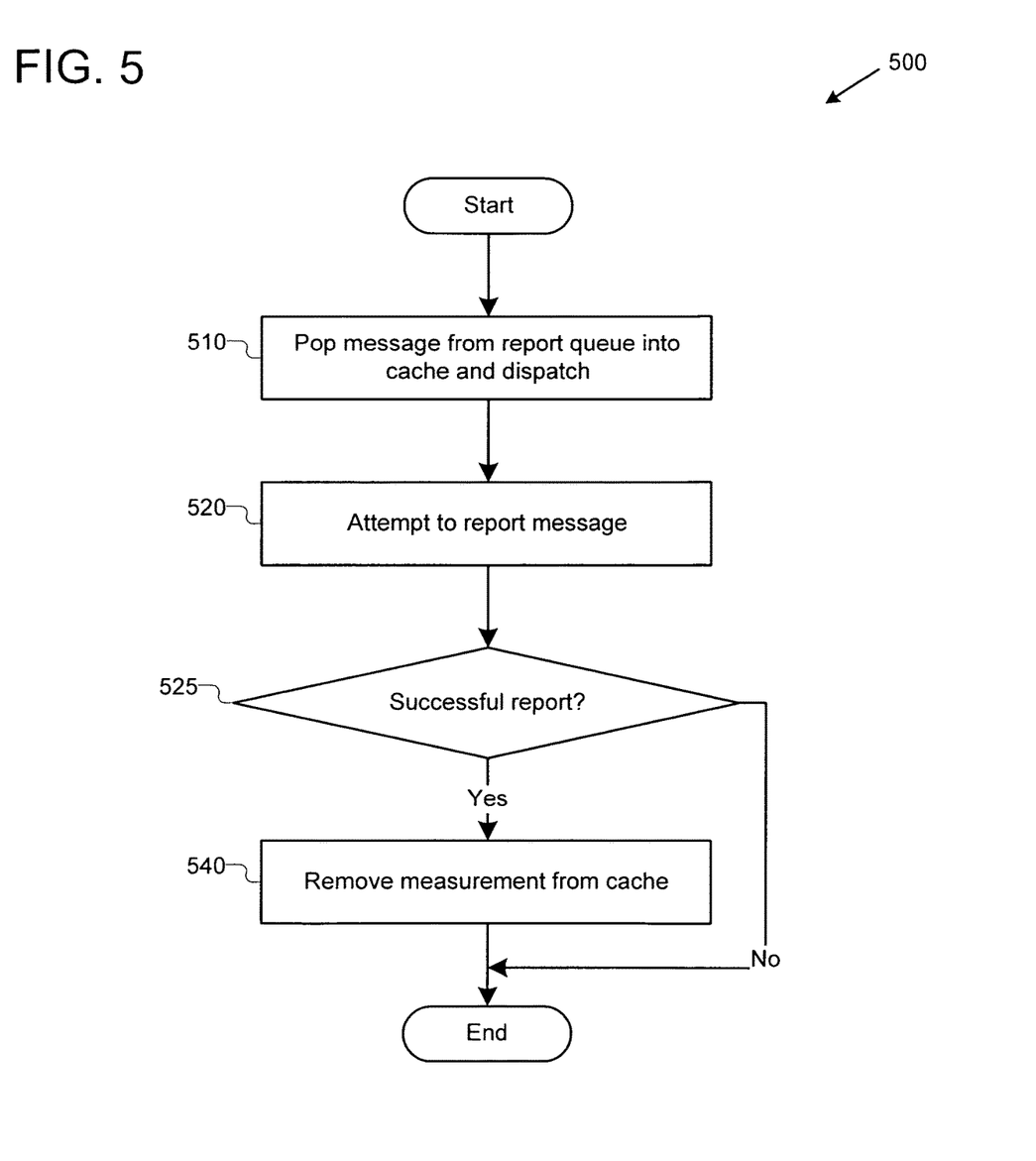
FIG. 5 illustrates an example process for reporting and caching of measurements, in accordance with various embodiments.

Referring now to FIG. 5, an example process 500 for reporting and caching of measurements is illustrated in accordance with various embodiments. In various embodiments, process 500 may be performed to implement, in whole or in part, operations 330 and 350 of process 300 of FIG. 3. While FIG. 5 illustrates particular operations in a particular order, in various embodiments the operations may be combined, split into parts, and/or omitted.

The process may begin at operation 510, where the MR 250 may pop the top message from the RQ 225 to the MC 235 and the MD 280. Next, at operation 520, the MD 280 may attempt to dispatch the message to one or more message consumers in order to report the measurement, such as data aggregators, websites, etc. At decision operation 525, the MD 280 may determine whether the reporting was successful. For example, the MD 280 may look for an acknowledgement from a message consumer that the message was received. In another example, the MD 280 may receive an error message, such as from the CD 290 or from a networking device external to the IoT device 200, that the message was not dispatched to one or consumers. If the report was not successful, then the process may then end, with a copy of the message which failed to dispatch remaining in the MC 235. If, however, the report was successful, then at operation 530 the message may be removed from the MC 235 and the process may then end.

Figure 6:
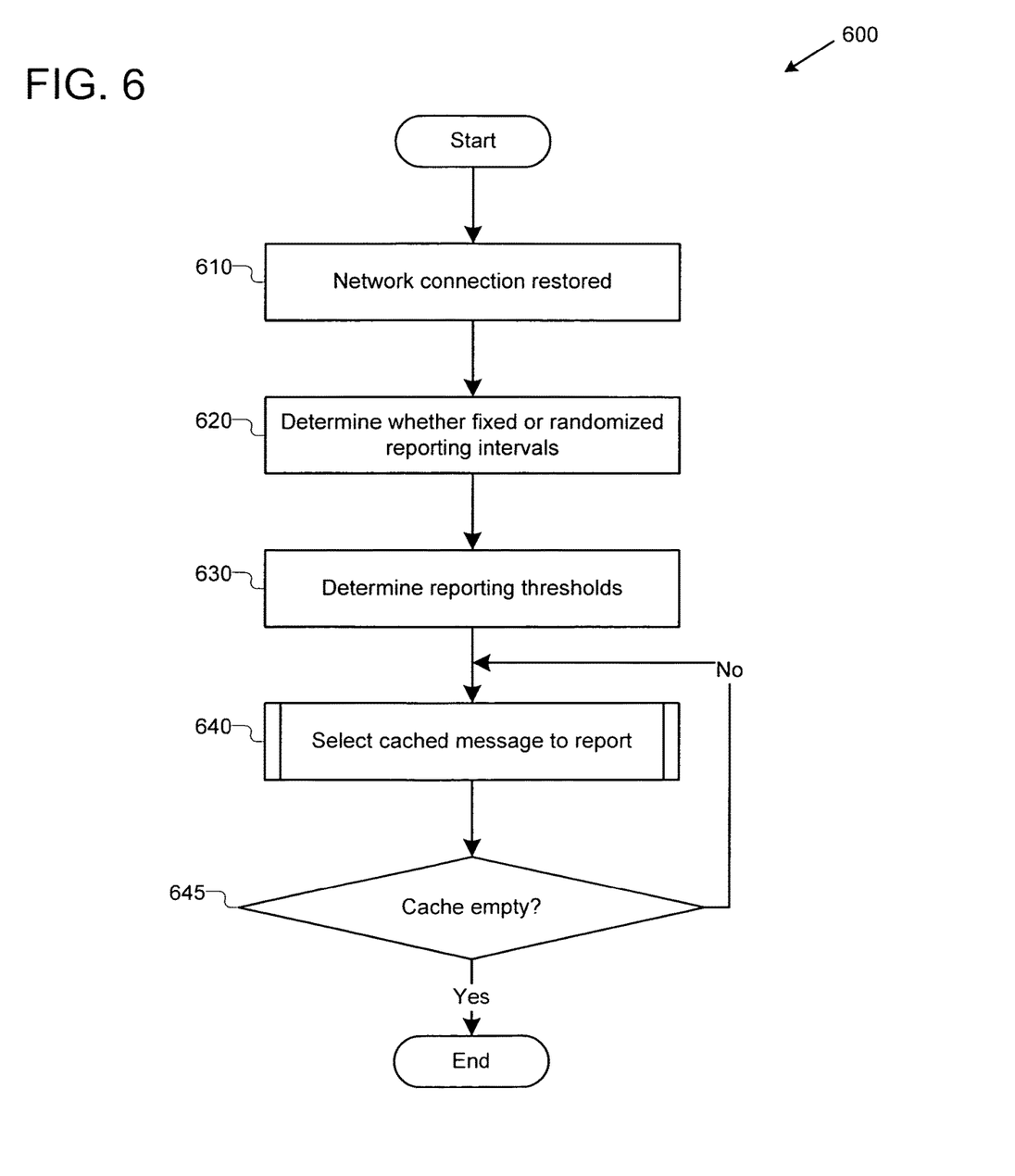
FIG. 6 illustrates an example process for selectively reporting cached measurements, in accordance with various embodiments.

Referring now to FIG. 6, an example process 600 for selectively reporting cached measurements is illustrated in accordance with various embodiments. In various embodiments, process 600 may be performed to implement, in whole or in part, operation 370 of process 300 of FIG. 3. While FIG. 6 illustrates particular operations in a particular order, in various embodiments the operations may be combined, split into parts, and/or omitted. The process may begin at operation 610, where the DC 290 may detect that the network connection of the IoT device 200 has been restored. Next, at operation 620, the MRS 230 may determine whether to provide fixed or randomized intervals for selectively reporting cached measurements. In various embodiments, the MRS 230 may elect to utilize randomized intervals in order to reduce simultaneous reporting of cached measurements by multiple IoT devices 200, which could cause network delays, or even possible interruptions. In other embodiments, the MRS 230 may select a fixed reporting interval to, for example, clear the cache of messages as soon as possible.

Next, at operation 630, the EA 240 may determine reporting thresholds for selective reporting of measurements. As discussed above, in various embodiments, the EA 240 may select one or more rate-of-change thresholds for measurements. In other embodiments, the EA 240 may select direct-value thresholds, such as to create a non-reporting band of measurements that do not fall outside of these thresholds. In yet other embodiments, the EA 240 may select statistical thresholds, such as to select measurements that are less statistically likely to report. In various embodiments, the EA 240 may determine these thresholds based on a history of measurements obtained by the IoT device 200. In various embodiments, this history may be taken over the entire lifetime of the IoT device 200; in other embodiments, the history may be over a recent window of time that is less than the entire lifetime of the IoT device 200.

Next at operation 640, the EA 240 may select a cached message to report. Particular embodiments of the process of operation 640 may also be described below with reference to process 700 of FIG. 7. Next, at decision operation 645 the MRS 230 may determine if the MC 235 is empty. If not, then the process may repeat to operation 640. In various embodiments, operations 640 and 645 may repeat at a fixed or randomized interval depending on what intervals were determined at operation 620. If the MC 235 is empty, however, the process may then end.

Figure 7:
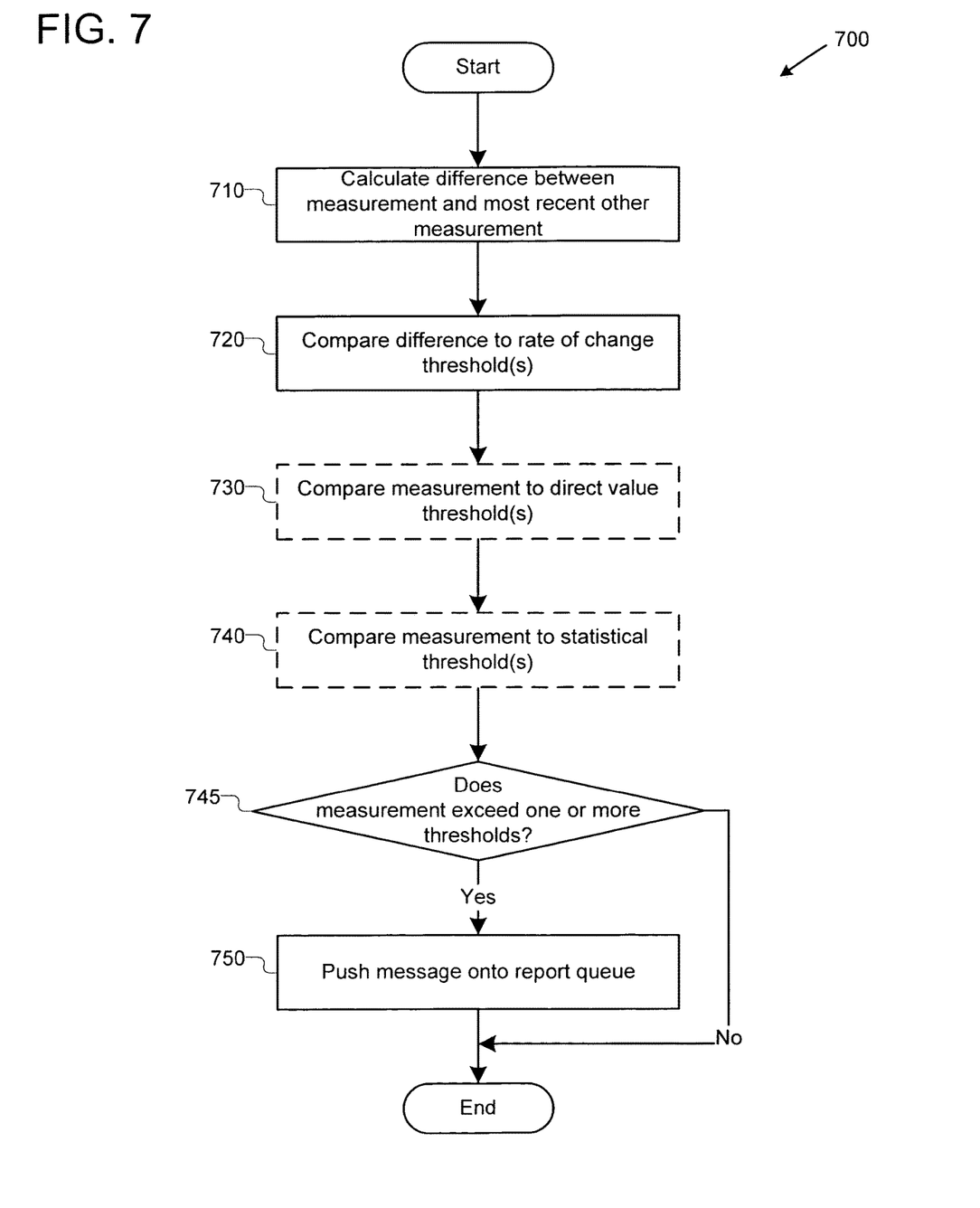
FIG. 7 illustrates an example process for selecting a cached message for selective reporting, in accordance with various embodiments.

Referring now to FIG. 7, an example process 700 for selecting a cached message for selective reporting is illustrated in accordance with various embodiments. In various embodiments, process 700 may be performed to implement, in whole or in part, operation 640 of process 600 of FIG. 6. While FIG. 7 illustrates particular operations in a particular order, in various embodiments the operations may be combined, split into parts, and/or omitted. The process may begin at operation 710, where the EA 240 may, for the measurement associated with a current message, calculate the difference between that measurement and the most recent other measurement preceding it. Next, at operation 720, the EA 240 may compare this difference to one or more rate-of-change thresholds determined during process 600. At optional operation 730, the EA 240 may compare the measurement value to one or more direct value thresholds, if such thresholds were determined. At optional operation 740, the EA 240 may compare the measurement value to one or more statistical thresholds, if such thresholds were determined. After comparison of the measurement to various thresholds, at decision operation 745, the EA 240 may determine whether the measurement exceeds one or more of the thresholds. If so, then the MRS 230 may push the message with the measurement onto the RQ 225 to be subsequently reported. If not, then the process may end.

Figure 8:
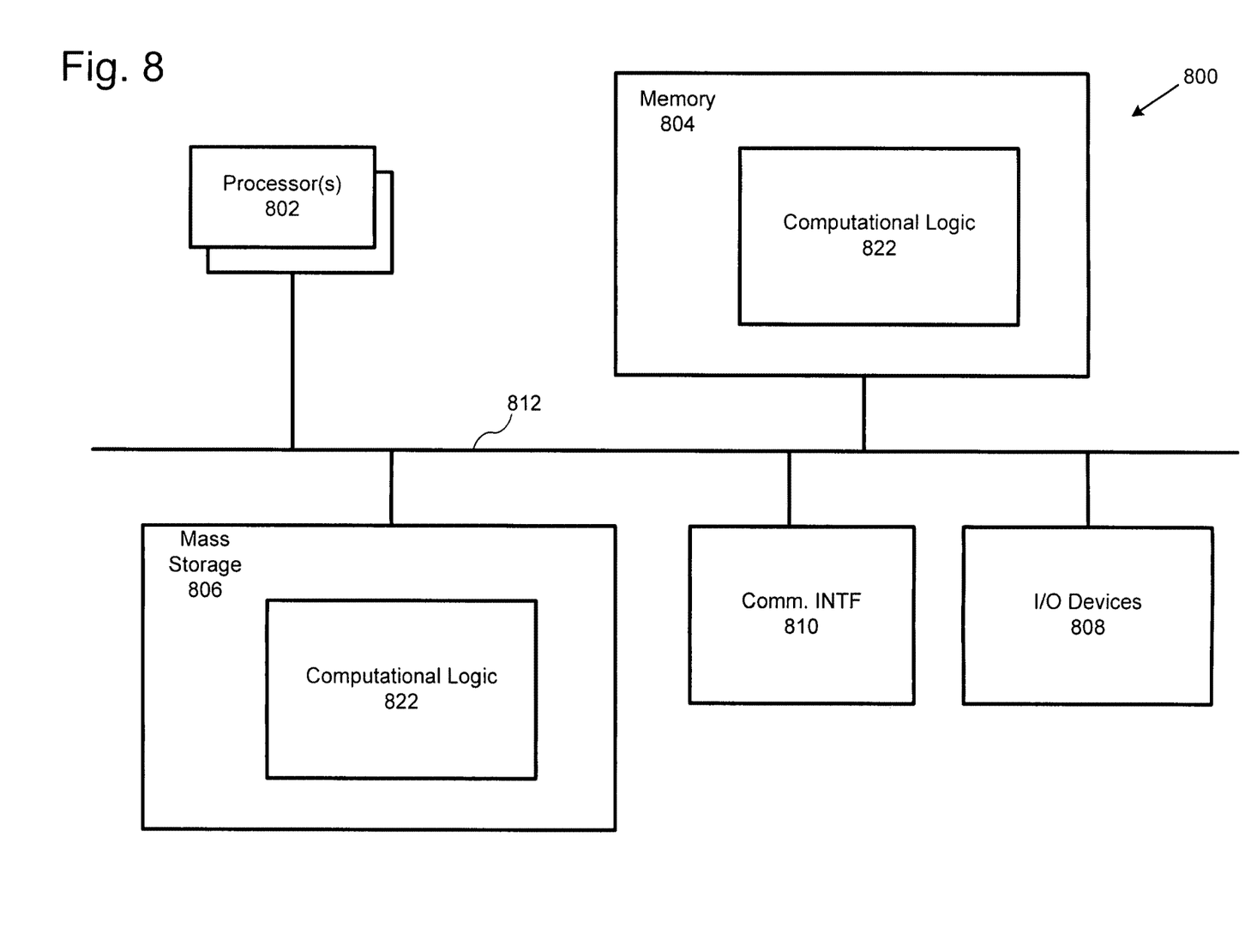
FIG. 8 illustrates an example computing environment suitable for practicing various aspects of the present disclosure, in accordance with various embodiments.

Referring now to FIG. 8, an example computer suitable for practicing various aspects of the present disclosure, including processes of FIGS. 3-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and so forth) and communication interfaces 810 (such as network interface cards, modems, infrared receivers, radio transceivers (e.g., Bluetooth, Wi-Fi, Near Field Communications, Radio-frequency identification, and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing one or more of the operations associated with the selective measurement reporting techniques described with references to FIGS. 3-7, collectively referred to as computing logic 822. The various elements may be implemented by assembler instructions supported by processor(s) 802 or high-level languages, such as, for example, C, that can be compiled into such instructions. In various embodiments, the system memory 804 or mass storage 806 may include various memory implementations, including integrated flash memory, such as in a System on a Chip, a USB flash drive, SD Card, on SATA SSD, etc.

The permanent copy of the programming instructions may be placed into permanent storage devices 806 in the factory, or in the field, through, for example, a distribution medium (not shown), such as a compact disc (CD), or through communication interface 810 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 810-812 may vary. Their constitutions are otherwise known, and accordingly will not be further described.

Figure 9:
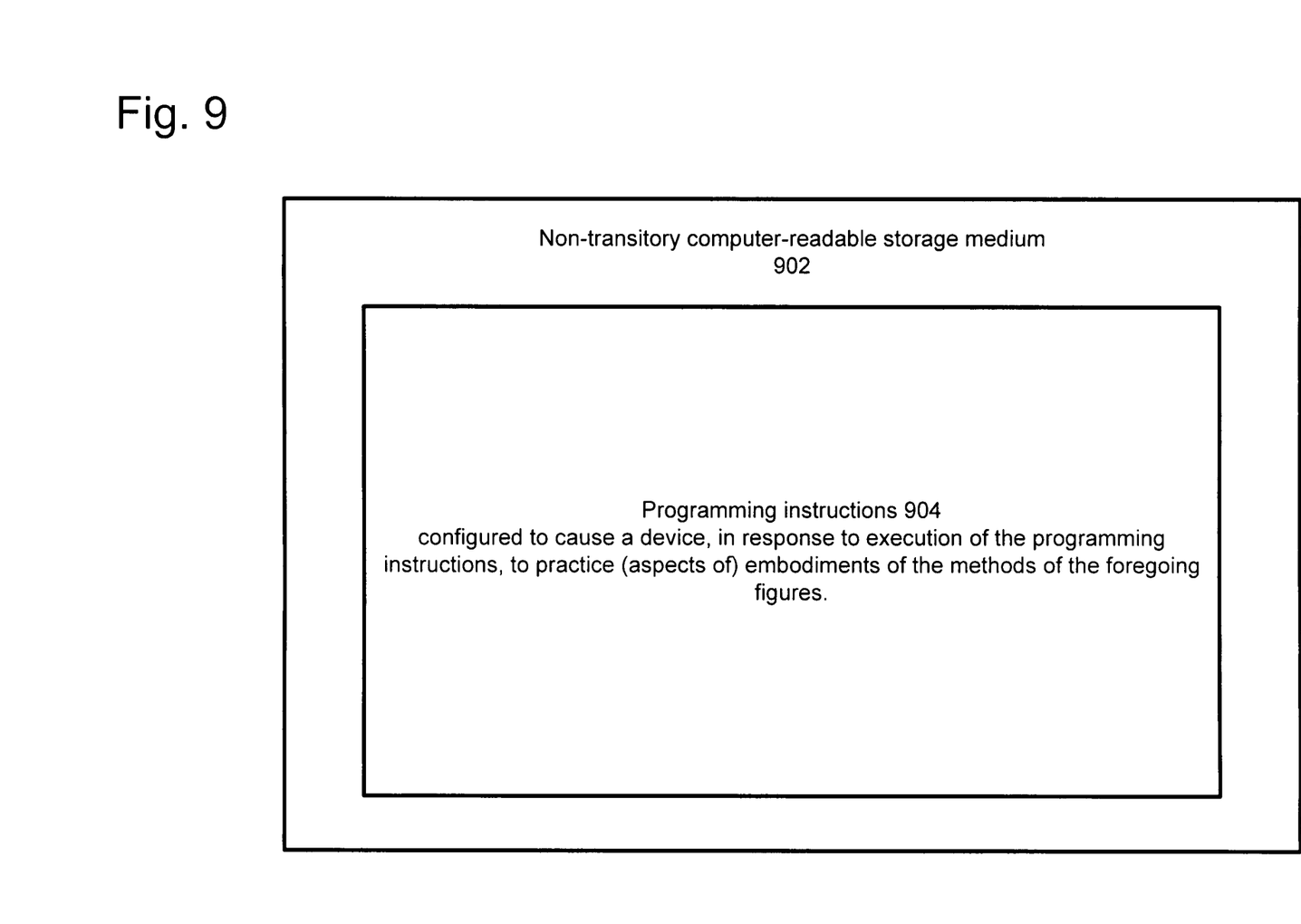
FIG. 9 illustrates an example storage medium with instructions configured to enable an apparatus to practice various aspects of the present disclosure, in accordance with various embodiments.

FIG. 9 illustrates an example least one computer-readable storage medium 902 having instructions configured to practice all or selected ones of the operations associated with the techniques earlier described, in accordance with various embodiments. As illustrated, least one computer-readable storage medium 902 may include a number of programming instructions 904. Programming instructions 904 may be configured to enable a device, e.g., computer 800, in response to execution of the programming instructions, to perform, e.g., various operations of processes of the figures described above, e.g., but not limited to, to the various operations performed to perform selective reporting techniques described herein In alternate embodiments, programming instructions 904 may be disposed on multiple least one computer-readable storage media 902 instead.

Referring back to FIG. 8, for one embodiment, at least one of processors 802 may be packaged together with a memory having computational logic 822 configured to practice aspects of processes of FIGS. 3-7. For one embodiment, at least one of processors 802 may be packaged together with a memory having computational logic 822 configured to practice aspects of processes of FIGS. 3-7 to form a System in Package (SiP). For one embodiment, at least one of processors 802 may be integrated on the same die with a memory having computational logic 822 configured to practice aspects of processes of FIGS. 3-7. For one embodiment, at least one of processors 802 may be packaged together with a memory having computational logic 822 configured to practice aspects of processes of FIGS. 3-7 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an Internet of Things (IoT) device. The IoT device may include one or more sensors to obtain one or more measurements and one or more computing processors coupled with the one or more sensors. The IoT device may also include a measurement reporter to operate on the one or more computer processors to: identify a measurement obtained by the sensor that may be to be reported from the IoT device to an external device; perform an analysis, based at least in part on the measurement as well as a one or more previous measurements, on whether to report the measurement to the external device; and selectively report the measurement based at least in part on a result from the analysis.

Example 2 may include the IoT device of example 1, and further may include a connection status detector to detect a status of a network connection between the IoT device and the external device.

Example 3 may include the IoT device of example 2, wherein the measurement reporter may be to report measurements upon detection of restoration of a previously broken network connection by the connection status detector.

Example 4 may include the IoT device of example 3, wherein the measurement reporter may be to report measurements that were cached during a period in which the network connection was broken.

Example 5 may include the IoT device of example 4, and further may include a cache to maintain measurements during the period in which the network connection was broken and wherein the measurement reporter may be to report measurements from the cache.

Example 6 may include the IoT device of example 2, wherein the measurement reporter may be to report measurements upon detection of an increase in bandwidth of the connection by the connection status detector.

Example 7 may include the IoT device of any of examples 1-6, wherein the measurement reporter may be to perform the analysis by determining whether entropy of the measurement may be higher than a threshold, based on the measurement history.

Example 8 may include the IoT device of any of examples 1-6, wherein the measurement reporter may be to perform the analysis by determining a rate of change of measurements obtained by the sensor at a time contemporaneous with a time when the sensor obtained the measurement.

Example 9 may include the IoT device of example 8, wherein the measurement reporter may be to determine whether the rate of change may be above a threshold.

Example 10 may include the IoT device of any of examples 1-6, wherein the measurement reporter may be to perform the analysis through determination of whether the measurement may be outside of a non-reporting band.

Example 11 may include the IoT device of example 10, wherein the measurement reporter may be to determine whether the measurement may be outside of a non-reporting band described by direct measurement values.

Example 12 may include the IoT device of example 10, wherein the measurement reporter may be to determine if the measurement may be outside of a non-reporting band described by statistical values.

Example 13 may include the IoT device of any of examples 1-12, wherein the measurement reporter may be to perform the analysis based on a measurement history which may include a history over a lifetime of the IoT device.

Example 14 may include the IoT device of any of examples 1-12, wherein the measurement reporter may be to perform the analysis based on a measurement history may include a history taken over a window of time that may be less than a lifetime of the IoT device.

Example 15 may include one or more computer-readable media containing instructions written thereon that, in response to execution by an Internet of Things (IoT) device, cause the IoT device to: obtain one or more measurements; identify an obtained measurement that may be to be reported from the IoT device to an external device; perform an analysis, based at least in part on the measurement as well as a one or more previous measurements, on whether to report the measurement to the external device; and selectively report the measurement based at least in part on a result from the analysis.

Example 16 may include the one or more computer-readable media of example 15, wherein the instructions may be further to detect a status of a network connection between the IoT device and the external device.

Example 17 may include the one or more computer-readable media of example 16, wherein selectively report the measurement may include report the measurement upon detection of restoration of a previously broken network connection.

Example 18 may include the one or more computer-readable media of example 17, wherein selectively report the measurement may include report the measurement from a cache of the IoT device into which the measurement was cached during a period in which the network connection was broken.

Example 19 may include the one or more computer-readable media of example 18, wherein the instructions may be further to maintain measurements in the cache during the period in which the network connection was broken.

Example 20 may include the one or more computer-readable media of example 16, wherein selectively report the measurement may include report the measurement upon detection of an increase in bandwidth of the connection.

Example 21 may include the one or more computer-readable media of any of examples 15-20, wherein perform the analysis may include determine whether entropy of the measurement may be higher than a threshold, based on the measurement history.

Example 22 may include the one or more computer-readable media of any of examples 15-20, wherein perform the analysis may include determine a rate of change of obtained measurements at a time contemporaneous with a time when the measurement was obtained.

Example 23 may include the one or more computer-readable media of example 22, wherein determine the rate of change may include determine whether the rate of change may be above a threshold.

Example 24 may include the one or more computer-readable media of any of examples 15-20, wherein perform the analysis may include determine whether the measurement may be outside of a non-reporting band.

Example 25 may include the one or more computer-readable media of example 24, wherein determine whether the measurement may be outside of a non-reporting band may include determine whether the measurement may be outside of a non-reporting band described by direct measurement values.

Example 26 may include the one or more computer-readable media of example 24, wherein determine whether the measurement may be outside of a non-reporting band may include determine whether the measurement may be outside of a non-reporting band described by statistical values.

Example 27 may include the one or more computer-readable media of examples 15-26, wherein perform the analysis may include perform the analysis based on a measurement history which may include a history over a lifetime of the IoT device.

Example 28 may include the one or more computer-readable media of any of examples 15-26, wherein perform the analysis may include perform the analysis based on a measurement history which may include a history taken over a window of time that may be less than a lifetime of the IoT device.

Example 29 may include a computer-implemented method. The method may include: obtaining, by an Internet of Things (IoT) device, one or more measurements; identifying, by the IoT device, an obtained measurement that may be to be reported from the IoT device to an external device; performing, by the IoT device, an analysis based at least in part on the measurement as well as a one or more previous measurements, on whether to report the measurement to the external device; and selectively reporting, by the IoT device, the measurement based at least in part on a result from the analysis.

Example 30 may include the method of example 29, and further may include detecting, by the IoT device, a status of a network connection between the IoT device and the external device.

Example 31 may include the method of example 30, wherein selectively reporting the measurement may include reporting the measurement upon detection of restoration of a previously broken network connection.

Example 32 may include the method of example 31, wherein selectively reporting the measurement may include reporting the measurement from a cache of the IoT device into which the measurement was cached during a period in which the network connection was broken.

Example 33 may include the method of example 32, and further may include maintaining, by the IoT device, measurements in the cache during the period in which the network connection was broken.

Example 34 may include the method of example 30, wherein selectively reporting the measurement may include reporting the measurement upon detection of an increase in bandwidth of the connection.

Example 35 may include the method of any of examples 29-34, wherein performing the analysis may include determining whether entropy of the measurement may be higher than a threshold, based on the measurement history.

Example 36 may include the method of any of examples 29-34, wherein performing the analysis may include determining a rate of change of obtained measurements at a time contemporaneous with a time when the measurement was obtained.

Example 37 may include the method of example 36, wherein determining the rate of change may include determining whether the rate of change may be above a threshold.

Example 38 may include the method of any of examples 29-34, wherein performing the analysis may include determining whether the measurement may be outside of a non-reporting band.

Example 39 may include the method of example 38, wherein determining whether the measurement may be outside of a non-reporting band may include determining whether the measurement may be outside of a non-reporting band described by direct measurement values.

Example 40 may include the method of example 38, wherein determining whether the measurement may be outside of a non-reporting band may include determining whether the measurement may be outside of a non-reporting band described by statistical values.

Example 41 may include the method of examples 29-40, wherein performing the analysis may include performing the analysis based on a measurement history which may include a history over a lifetime of the IoT device.

Example 42 may include the method of any of examples 29-40, wherein performing the analysis may include performing the analysis based on a measurement history which may include a history taken over a window of time that may be less than a lifetime of the IoT device.

Example 43 may include an Internet of Things (IoT) device. The IoT device may include: means for obtaining one or more measurements; means for identifying an obtained measurement that may be to be reported from the IoT device to an external device; means for performing an analysis based at least in part on the measurement as well as a one or more previous measurements, on whether to report the measurement to the external device; and means for selectively reporting the measurement based at least in part on a result from the analysis.

Example 44 may include the IoT device of example 43, and further may include means for detecting a status of a network connection between the IoT device and the external device.

Example 45 may include the IoT device of example 44, wherein means for selectively reporting the measurement may include means for reporting the measurement upon detection of restoration of a previously broken network connection.

Example 46 may include the IoT device of example 45, wherein means for selectively reporting the measurement may include means for reporting the measurement from a cache of the IoT device into which the measurement was cached during a period in which the network connection was broken.

Example 47 may include the IoT device of example 46, and further may include means for maintaining measurements in the cache during the period in which the network connection was broken.

Example 48 may include the IoT device of example 44, wherein means for selectively reporting the measurement may include means for reporting the measurement upon detection of an increase in bandwidth of the connection.

Example 49 may include the IoT device of any of examples 43-48, wherein means for performing the analysis may include means for determining whether entropy of the measurement may be higher than a threshold, based on the measurement history.

Example 50 may include the IoT device of any of examples 43-48, wherein means for performing the analysis may include means for determining a rate of change of obtained measurements at a time contemporaneous with a time when the measurement was obtained.

Example 51 may include the IoT device of example 50, wherein means for determining the rate of change may include means for determining whether the rate of change may be above a threshold.

Example 52 may include the IoT device of any of examples 43-48, wherein means for performing the analysis may include means for determining whether the measurement may be outside of a non-reporting band.

Example 53 may include the IoT device of example 52, wherein means for determining whether the measurement may be outside of a non-reporting band may include means for determining whether the measurement may be outside of a non-reporting band described by direct measurement values.

Example 54 may include the IoT device of example 38, wherein means for determining whether the measurement may be outside of a non-reporting band may include means for determining whether the measurement may be outside of a non-reporting band described by statistical values.

Example 55 may include the IoT device of examples 43-54, wherein means for performing the analysis may include means for performing the analysis based on a measurement history which may include a history over a lifetime of the IoT device.

Example 56 may include the IoT device of any of examples 43-54, wherein means for performing the analysis may include means for performing the analysis based on a measurement history which may include a history taken over a window of time that may be less than a lifetime of the IoT device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An Internet of Things (IoT) device, comprising:
one or more sensors arranged to obtain a plurality of measurements;
one or more computing processors coupled with the one or more sensors, the one or more computer processors are arranged to operate a measurement reporter to:
in response to detection of a disconnection of a network connection, control storage of measurements of the plurality of measurements obtained during the disconnection of the network connection,
determine a rate of change of the stored measurements,
identify one or more measurements of the stored measurements representative of the rate of change, and
selectively report the one or more measurements in response to detection of a restoration of the network connection.

2. The IoT device of claim 1, wherein the one or more computer processors arranged to operate a connection status detector, the connection status detector arranged to detect a status of a network connection between the IoT device and the external device.

3. The IoT device of claim 2, wherein the measurement reporter is arranged to report measurements obtained after the detection of the restoration of the network connection by the connection status detector.

4. The IoT device of claim 3, wherein the measurement reporter is arranged to control storage of the measurements that were obtained when the network connection was broken in a message cache.

5. The IoT device of claim 4, wherein the message cache arranged to store measurements obtained when the network connection was broken and wherein the measurement reporter is arranged to report the one or more measurements from the cache.

6. The IoT device of claim 2, wherein the measurement reporter is arranged to report the one or more measurements upon detection of an increase in bandwidth of the connection by the connection status detector.

7. The IoT device of claim 1, wherein the measurement reporter is arranged to determine whether entropy of the stored measurements is higher than a threshold based at least in part on a measurement history including at least the stored measurements and other obtained measurements.

8. The IoT device of claim 1, wherein the measurement reporter is arranged to determine the rate of change of the stored measurements at a time contemporaneous with a time when the sensor obtained the stored measurements; and determine whether the rate of change is above a threshold.

9. The IoT device of claim 1, wherein, to identify the one or more measurements representative of the rate of change, the measurement reporter is arranged to:
determine which of the stored measurements show a higher rate of change relative to other adjacent-in-time measurements of the stored measurements; and
select a predetermined number of the higher-rate-of-change measurements as the one or more measurements representative of the rate of change.

10. The IoT device of claim 1, wherein the measurement reporter is arranged to determine whether the stored measurements are outside of a non-reporting band.

11. The IoT device of claim 10, wherein the measurement reporter is arranged to determine whether the stored measurements are outside of a non-reporting band described by directly measurement values.

12. The IoT device of claim 10, wherein the measurement reporter is arranged to determine if the stored measurements are outside of a non-reporting band described by statistical values.

13. The IoT device of claim 12, wherein the statistical values are based on a measurement history comprising a history of measurements obtained by the one or more sensors over a lifetime of the IoT device.

14. The IoT device of claim 12, wherein the statistical values are based on a measurement history comprising a history of measurements obtained by the one or more sensors over a window of time that is less than a lifetime of the IoT device.

15. One or more non-transitory computer-readable media (NTCRM) comprising instructions written thereon, wherein execution of the instructions by an Internet of Things (IoT) device is to cause the IoT device to:
generate a plurality of measurements based on sensor data obtained from sensor circuitry of the IoT device;
detect disconnection of a network connection;
control storage of measurements of the plurality of measurements obtained during the disconnection;
determine a rate of change of individual ones of the stored measurements relative to other adjacent-in-time ones of the stored measurements; and
in response to detection of a restoration of the network connection: identify one or more measurements of the stored measurements representative of the rate of change, and control transmission of a report including the one or more measurements.

16. The one or more NTCRM of claim 15, wherein execution of the instructions is to cause the IoT device to control storage of the measurements in a measurement cache.

17. The one or more NTCRM of claim 16, wherein execution of the instructions is to cause the IoT device to generate the report to include the one or more measurements from the measurement cache of the IoT device.

18. The one or more NTCRM of claim 15, wherein execution of the instructions is to cause the IoT device to:
determine whether entropy of the stored measurements is higher than a threshold based at least in part on a measurement history including at least the stored measurements and one or more previous measurements; and
determine the rate of change at a time contemporaneous with a time when the stored measurements were obtained.

19. The one or more NTCRM of claim 15, wherein execution of the instructions is to cause the IoT device to:
   determine which of the stored measurements show a higher rate of change relative to other adjacent-in-time measurements of the stored measurements; and
   select a predetermined number of the higher-rate-of-change measurements as the one or more measurements representative of the rate of change.

20. The one or more NTCRM of claim 15, wherein perform execution of the instructions is to cause the IoT device to determine whether the one or more measurements are outside of a non-reporting band.

21. A computer-implemented method, comprising:
   obtaining, by an Internet of Things (IoT) device, measurements based on sensor data collected by one or more sensors of the IoT device;
   detecting, by the IoT device, disconnection of a network connection;
   storing, by the IoT device, measurements obtained during the disconnection in a measurement cache;
   performing, by the IoT device, an entropy analysis on the stored measurements, the entropy analysis being based at least in part on a rate of change of the stored measurements; and
   selectively reporting, by the IoT device to an external device, one or more measurements of the stored measurements representative of the entropy analysis after detection of a restoration of the network connection.

22. The method of claim 21, wherein the selectively reporting comprises reporting the one or more measurements upon the detection of the restoration of the network connection.

23. The method of claim 21, wherein performing the analysis comprises:
   determining whether entropy of the stored measurements is higher than a threshold, based at least in part on a measurement history including at least the stored measurements and one or more previous measurements; or
   determining whether the rate of change of the stored measurements at a time contemporaneous with a time when the stored measurements was obtained is above the threshold.

24. The method of claim 21, wherein:
   performing the analysis comprises determining which of the stored measurements show a higher rate of change relative to other adjacent-in-time measurements of the stored measurements; and
   the selectively reporting comprises selecting a predetermined number of the higher-rate-of-change measurements as the one or more measurements representative of the rate of change.

\* \* \* \* \*